Figure 1:
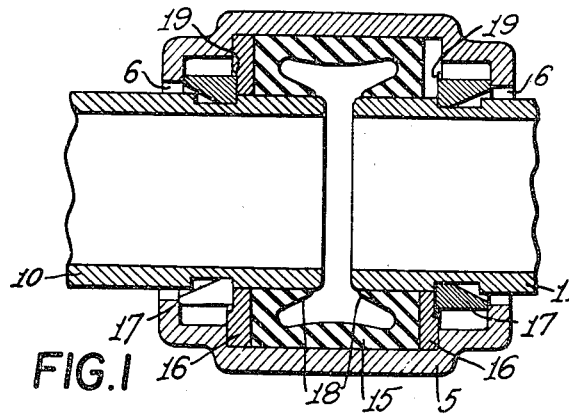

Aug. 23, 1949.  A. E. OSBORN  2,479,960

PIPE JOINT

Filed Jan. 10, 1946

INVENTOR.
Alden E. Osborn

Patented Aug. 23, 1949

2,479,960

UNITED STATES PATENT OFFICE 2,479,960

PIPE JOINT

Alden E. Osborn, Mount Vernon, N. Y.

Application January 10, 1946, Serial No. 640,250

11 Claims. (Cl. 285—193)

An object of this invention is to provide improved pipe joints or couplings for that type of pipe or other cylindrical member having grooves in its outer surface whereby the pipe or member can be connected to a socket member without the use of tools by simply pushing it into the joint.

Another object of my invention is to provide a method of releasing the locking means whereby the pipe or member can be removed from the socket member or fitting, even tho it is in the center of an assembled line, without disturbing adjacent parts or moving them longitudinally.

Still another object is to provide a means to hold the pipe or member lock rings in position in the pipe or member groove without depending upon the spring of the ring material to cause the rings to contract in the groove. This means for holding the rings in position independently of their internal spring is of importance as, when the spring of the ring only is used to retain it in the groove, a great range of spring action is required and its enlargement in order to spring it over the end of the pipe or member does not permit of its contraction against the groove bottom with a pressure sufficient to hold it in place reliably under certain conditions.

It should be understood that various modifications within the scope of the appended claims can be made in the different embodiments of my invention as shown in the accompanying drawing.

Figure 2:
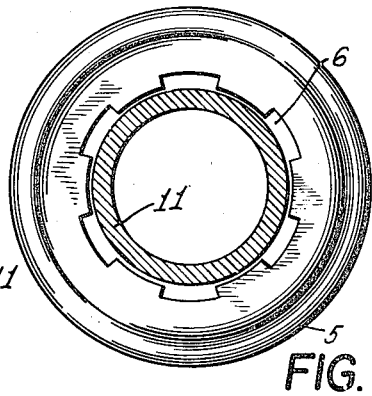
Figure 3:
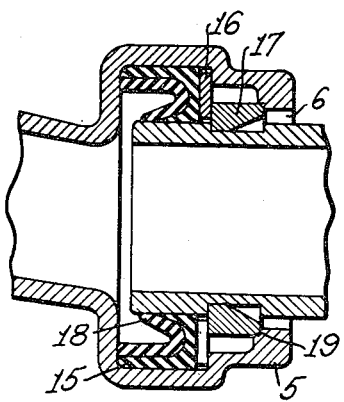
Figure 4:
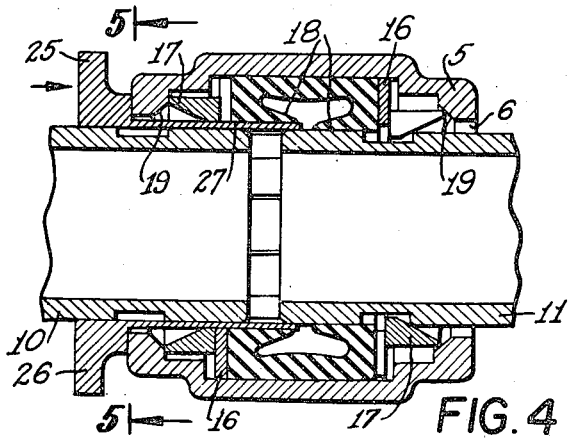
Figure 5:
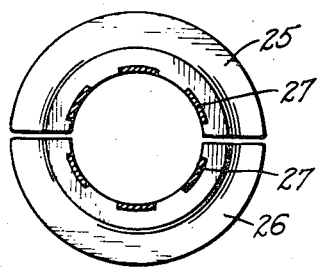
Figure 6:
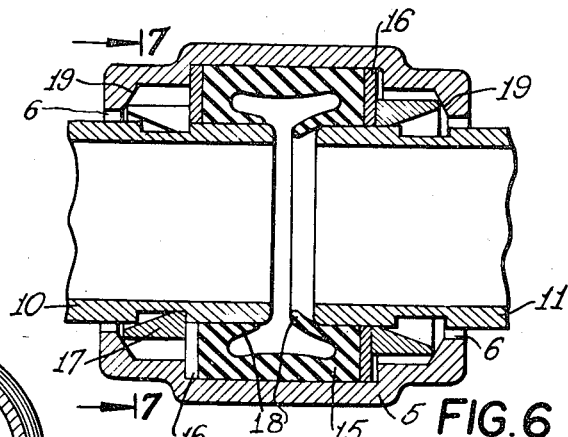
Figure 7:
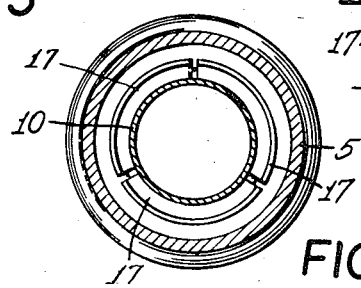

In the drawing:

Fig. 1 represents a longitudinal sectional view of a coupling embodying one form of my invention, Fig. 2 represents an end elevation of the form of my invention shown in Fig. 1, Fig. 3 represents a longitudinal sectional view of my invention applied to a joint between a fitting and pipe, Fig. 4 represents a modification of the coupling shown in Fig. 1 also illustrating a tool means for releasing the pipe from the coupling, Fig. 5 represents a sectional elevation of the tool means of Fig. 4 taken on the line 5—5, Fig. 6 represents a longitudinal sectional view of still another modification of my invention, and Fig. 7 represents a sectional elevation of Fig. 6 taken on the line 7—7.

In Fig. 1, 10 and 11 represent the ends of pipes adapted to be connected by my coupling which comprises a collar 5 containing a single channel in its interior in which is placed a special packing gasket member 15, and two longitudinally movable split washers or rings 16 and two split internally tapered lock rings 17. The packing gasket 15 is shown in a form that is usually employed in joints of grooved pipe and comprises a ring of flexible material that has inwardly projecting parts 18 which surround the pipe and have an open space between them so that the contents of the pipe exert a pressure on the exterior of these parts and thus forcibly engage their inner surfaces with the exterior of the pipe so as to form a tight joint automatically as is usual with this form of gasket. The two longitudinally slidable washers 16 are at each side of this gasket 15 and are inserted into the sleeve channel before the packing gasket is inserted by springing an end of the washer into the channel and turning in the remainder with the other end temporarily bent out of line with the part that is first put into the channel. The lock rings 17 can be sprung into the channel between the outer surfaces of the sliding washers either before the packing ring has been placed in the channel or after all the other parts have been assembled. These lock rings are shown as provided with an internally tapered surface so that they will open up when the pipe is being put in position and, if in one piece, it is preferable to make them with sufficient spring to close against the bottom of the groove of the pipe as soon as the pipe is pushed into the coupling to its maximum extent. An important feature of my invention, however, lies in the means to center the ring and to supplement this spring action of the ring and positively prevent the lock rings from expanding and getting out of the pipe groove when the pipe is in position. This comprises providing the longitudinally slidable washers 16 with a shoulder or ledge 19 that surrounds the exterior of the lock ring so that the lock ring cannot expand without sliding the washers longitudinally and compressing the gasket 15 which preferably fits tightly between them. This positive lock shoulder would usually be sufficient to prevent the expansion of the lock rings from leaving the pipe groove and, when pressure is exerted inside of the gasket, this pressure tends to widen the gasket against the washers and prevents their longitudinal movement to allow the shoulder on the washers to clear the exterior of the lock rings. Thus I employ the pressure of the contents of the pipe to lock the pipe positively in place and eliminate dependence on the spring of the lock rings for holding the pipes as in the case with other forms of grooved pipe joints that employ lock rings.

In order to release these lock rings and to allow the pipes to be removed from the joint I have provided the flanges at the end of the collar with a plurality of keyways 6 thru which thin tools can be inserted to engage the tapered surfaces of the lock rings and expand them which can be done when there is no pressure within the pipes to hold them positively in their locked position. The metal of the coupling or fitting between these keyways is made a relatively close fit on the pipe so that the pipes would be centered as, if a large enough clearance were allowed all around the external circumference of the pipe to permit the insertion of suitable ring-lifting tools, the pipe would not be centered in the coupling or fitting as accurately as is desirable.

In Fig. 3 is shown a modification of the pipe joint arrangements illustrated in the coupling of Fig. 1 that is applied to the end of the fitting. This modification consists of using a flat sliding washer 16 without the shoulder to lock the ring and placing the locking shoulder 19 on the interior of the end flange of the fitting 5. The action of this modified means for holding the pipe is similar to that just described in connection with Figs. 1 and 2. The coupling form of packing gasket 15 is modified and is based on the principle employed in sea rings so that it automatically tightens when subjected to internal pressure in the same way as the gaskets shown in the other figures. It is shown as a double form but, as my invention is not related to the packing means, other forms of packing can be used if desired.

In Fig. 4 is shown a coupling similar to that of Fig. 1 except that the means for holding the locking ring in position corresponds to that illustrated in Fig. 3. This figure also illustrates a means for allowing a complete coupling to be slid on to one of the pipes should it be desired to disconnect the coupling and remove a pipe without disturbing any of the adjacent pipes or connections. This is accomplished by means of a special tool that is illustrated in Fig. 5 and comprises two ring sections 25 and 26 that have fingers 27 projecting from one side which can be passed thru the key openings 6 at the ends of the coupling collar. These fingers are long enough to pass thru the tapered lock ring 17, the longitudinally slidable washers 16 and one half of the packing ring 15 so that when they are pushed or driven into place, the locking ring 17 is moved out of the pipe groove and one pipe-engaging part of the packing ring 15 is lifted off the pipe. The whole coupling with the tool sections can then be moved bodily along the pipes as indicated by the arrow until the coupling tool and couplings are clear of one of the pipes which could be removed by releasing the other end.

In Fig. 6 is illustrated a still further modification in that the lock rings 17 are held in position by a shoulder 19 which has its tapered ring-engaging surface on the interior of the collar of greater length than in the preceding forms. In this case the lock rings need not have any spring whatever if the packing 15 exerts a relatively strong pressure to separate the longitudinally slidable washers 16, as they would be forced into the pipe grooves by the expansion of the packing against the longitudinally sliding washers. Thus, it is possible to use rings 17 that have no spring whatever and depend upon the packing to force the rings into the pipe grooves. They may even be made in two or more sections, as shown in Fig. 7, instead of a continuous ring split at one point. The longitudinally sliding washers 16 may also be made in sections if desired since, after the parts are assembled, they would be held in position when the gasket is between the washers. It will be noticed that in Fig. 6 the pipe 11 is shown part way inserted into the coupling and that the split or cut parts of the various lock rings and washers are indicated in Figs. 1, 4, and 6 by the ring or washer section lines being omitted, as this unsectionlined portion represents an end view of the ring or washer at the split part.

I claim:

1. A coupling means for connecting a separable hollow circumferential shouldered member to an internally channelled socket member adapted to surround an end portion of the shouldered member, comprising a packing gasket in said channel and formed with a part adapted to be pressed against an exterior surface of said shouldered member by the pressure of the contents of said shouldered member acting against the outside surface of said part of the gasket that rests against the exterior of said shouldered member, a longitudinally slidable washer in said channel at the side of said gasket, a circumferentially arranged expandable lock means, comprising a plurality of rigid segments, between said slidable washer and an internal flange forming an end wall of said socket member channel and a shoulder means for maintaining said lock ring in its contracted position and for centralizing said lock means, said shoulder means being engageable with said lock means by the said longitudinal pressure of said packing against said washer.

2. A coupling means for connecting separable hollow circumferentially shouldered members to an internally channelled socket member adapted to surround an end portion of the shouldered member, comprising a packing gasket in said channel and formed with parts adapted to be pressed against an exterior surface of each of said shouldered members by the pressure of the contents of said pipes acting against the outer surface of said parts of said gasket that rest against the exterior of said shouldered members, longitudinally slidable washers in said socket member channel on each side of said gasket with said gasket exerting a longitudinal separating pressure thereon, circumferentially arranged expandable lock means, comprising a plurality of rigid segments having slanting internal surfaces between said slidable washers and the internal flanges forming the end walls of said socket member channel, and a shoulder means for maintaining said lock means in their contracted position and for centralizing said lock means, said shoulder means being engageable with said lock means by the said longitudinal separating pressure of said gasket upon said washers.

3. A coupling means for connecting separable hollow circumferentially channelled member to an internally channelled socket membe adapted to surround an end portion of th shouldered members, comprising a packing gaske in said channel and formed with parts adapte to be pressed against an exterior surface of eac of said shouldered members by the pressure the contents of said shouldered members actir against the outer surface of said parts of sa gasket that rest against the exterior of sa shouldered members, longitudinally slidab washers in said socket member channel on ea side of said gasket with said gasket exerting longitudinally separating pressure thereon, c cumferentially arranged expandable lock mea comprising a plurality of rigid segments betwe said slidable washers and the internal flang forming the end walls of said socket memt channel, and shoulders concentrically arrang on the inner surface of each of the end flan of said socket member channel and engagea with said lock means to maintain said lock me in their contracted position and to centralize said lock means, by said means being pressed against said shoulders thru said packing means exerting a longitudinal pressure to separate said washers.

4. A coupling means for connecting a separable shouldered member to an internally channeled socket member adapted to surround an end portion of said shouldered member, comprising an expandable lock means formed of a plurality of rigid segments in said channel and engageable, when in its contracted position, with the shoulder surface of said shouldered member, and a packing gasket also in said channel and adapted to both press against an exterior surface of said shouldered member and also to exert a radially contracting pressure on said lock means.

5. A coupling means for connecting a hollow separable shouldered member to an internally channeled socket member adapted to surround an end portion of said shouldered member, comprising an expandable lock means formed of a plurality of rigid segments, in said channel and engageable, when in its contracted position, with the shoulder surface of said shouldered member, and a packing gasket also in said channel and adapted to both press against an exterior surface of said shouldered member and also to exert a radially contracting pressure on said lock means, and means whereby the pressure of the contents of said shouldered member exerts an additional contracting pressure on said lock means.

6. A coupling means for connecting a separable shouldered member to an internally channeled socket member adapted to surround an end portion of said shouldered member, comprising an expandable lock means formed of a plurality of rigid segments, in said channel and engageable, when in its contracted position, with the shoulder surface of said shouldered member, and an elastic element also in said channel, and means whereby the longitudinal expansion of said element exerts a radially contracting pressure on said lock means.

7. A coupling means for connecting separable circumferentially shouldered members to an internally channeled socket member, comprising a gasket in said channel and formed with parts adapted to be pressed against an exterior surface of each of said shouldered members, circumferentially arranged expandable lock means formed of a plurality of rigid segments, also in said socket member channel and between the ends of said gasket and internal flanges forming the end walls of said socket channel, and shouldered means for maintaining said lock means in its contracted position and for centralizing said lock means, said lock means being pressed against said shouldered means by the longitudinal expansion of said gasket exerting a separating pressure thereon.

8. A coupling means for connecting a separable shouldered member to an internally channeled socket member adapted to surround an end portion of said shouldered member, comprising a packing gasket and an expandable lock means formed of a plurality of rigid segments, in said channel, with said gasket, when said shouldered member is inserted into said socket member, pressing radially against an exterior surface of said shouldered member adjacent to the end thereof and also acting thru its longitudinal expansion to exert a contracting pressure on said lock means to engage said lock means with the shouldered surface of said shoulder member whereby the contraction of said lock means is affected independently of the elasticity of said means.

9. A coupling means for connecting a separable circumferentially shouldered member to an internally channeled socket member adapted to surround an end portion of said shouldered member, comprising a gasket and a circumferentially arranged lock means in said channel with said lock means having a plurality of cuts therethru whereby to form independent radially movable segments expandable by the insertion of said shouldered member and contractable by the pressure of said gasket and engageable when in its said contracted position with the shoulder surface of said shouldered member.

10. A coupling means for connecting a separable hollow cylindrical member to an internally channeled socket member adapted to surround an end portion of said cylindrical member comprising a packing gasket in said channel and formed with a part adapted to be pressed against the exterior surface of said cylindrical member by the pressure of the contents of said member acting against the outer surface of said part of said gasket that rests against the exterior of said cylindrical member, a circumferentially arranged expandable lock means, formed of a plurality of rigid segments, in said socket member, means whereby said lock means is expanded by the forcible entry of the said cylindrical member into said socket member to allow said lock means to pass over the end of said cylindrical member and to rest upon the surface of said member, comprising a tapered surface in the interior of said lock means having its largest diameter exceeding the diameter of the end of said cylindrical member, and a shoulder means for centralizing said lock means in said socket before the insertion of said cylindrical member therein.

11. A coupling means for connecting a separable member to an internally channeled socket member adapted to surround an end portion of said separable member, comprising a circumferentially arranged gasket and a lock means in said channel, and a means for centralizing said separable member in said socket member independently of said gasket and said lock means comprising inwardly-projecting keys on said socket member at the outer side of the channel therein and adapted to contact with said separable member, with openings between said keys whereby a tool means can be inserted into said socket member to engage with said lock means to render said lock means ineffective and thereby release said separable member to permit it to be withdrawn from said socket member.

ALDEN E. OSBORN.

REFERENCES CITED

The following references are of record in the file of this patent:

UNITED STATES PATENTS

| Number | Name | Date |
| --- | --- | --- |
| 1,541,601 | Tribe | June 9, 1925 |
| 1,683,076 | Johnson et al. | Sept. 4, 1928 |
| 2,040,155 | Shoemaker | May 12, 1936 |